(12) United States Patent
Kawakami (10) Patent No.: US 10,955,388 B2
(45) Date of Patent: Mar. 23, 2021

(54) PREPROCESSING APPARATUS AND AN ANALYSIS SYSTEM INCLUDING THE PREPROCESSING APPARATUS

(71) Applicant: SHIMADZU CORPORATION, Kyoto (JP)

(72) Inventor: Daisuke Kawakami, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 247 days.

(21) Appl. No.: 16/053,139

(22) Filed: Aug. 2, 2018

(65) Prior Publication Data
US 2019/0041366 A1   Feb. 7, 2019

(30) Foreign Application Priority Data
Aug. 3, 2017   (JP) .............................. JP2017-150666

(51) Int. Cl.
*G01N 30/06* (2006.01)
*G01N 30/20* (2006.01)
(Continued)

(52) U.S. Cl.
CPC .............. *G01N 30/06* (2013.01); *G01N 30/20* (2013.01); *G01N 35/02* (2013.01); *G01N 35/10* (2013.01);
(Continued)

(58) Field of Classification Search
CPC .... G01N 30/06; G01N 30/20; G01N 35/1009; G01N 35/02; G01N 35/10; G01N 35/025;
(Continued)

(56) References Cited

U.S. PATENT DOCUMENTS

2011/0157580 A1   6/2011   Nogami et al.
2013/0143257 A1   6/2013   Small et al.
(Continued)

FOREIGN PATENT DOCUMENTS

EP   3037825 A1   6/2016
EP   3176576 A1   6/2017
(Continued)

OTHER PUBLICATIONS

Communication dated Jan. 3, 2019 from the European Patent Office in application No. 18187059.3.
(Continued)

*Primary Examiner* — Suman K Nath
(74) *Attorney, Agent, or Firm* — Sughrue Mion, PLLC (57) ABSTRACT

To provide a preprocessing apparatus with a function of stirring and sucking a sample in a sample container carried on a conveyor line outside the preprocessing apparatus.
The preprocessing apparatus includes a sampling unit, a unit that stirs a sample before suction, and a stirring operation control unit. The sampling unit includes a sample probe that sucks a sample in the sample container, and is configured to move the sample probe to the sample container set in the sample container setting part and to an external suction location set on a conveyor line located outside the preprocessing apparatus. The unit that stirs a sample before suction includes a stirring probe which stirs a sample in the sample container, and moves the stirring probe at least to the external suction location or a location upstream of the external suction location on the conveyor line. The stirring operation control unit is configured to control operation of the sampling unit and the unit that stirs a sample before suction so that a sample in the sample container is stirred by the stirring probe before the sample is sucked by the sample probe.

12 Claims, 5 Drawing Sheets

(51) Int. Cl.
*G01N 35/02* (2006.01)
*G01N 35/10* (2006.01)
*G01N 30/02* (2006.01)
*G01N 35/04* (2006.01)
*G01N 35/00* (2006.01)

(52) U.S. Cl.
CPC ..... *G01N 35/1009* (2013.01); *G01N 35/0099* (2013.01); *G01N 35/025* (2013.01); *G01N 2030/027* (2013.01); *G01N 2030/201* (2013.01); *G01N 2035/00534* (2013.01); *G01N 2035/0453* (2013.01); *G01N 2035/103* (2013.01); *G01N 2035/106* (2013.01); *G01N 2035/1025* (2013.01)

(58) Field of Classification Search
CPC ......... G01N 35/0099; G01N 2035/103; G01N 2035/0453; G01N 2035/106; G01N 2035/00534; G01N 2035/1025; G01N 2030/201; G01N 2030/027
See application file for complete search history.

(56) References Cited

U.S. PATENT DOCUMENTS

| | | | |
|---|---|---|---|
| 2016/0124008 A1 | 5/2016 | Kraemer et al. | |
| 2017/0138824 A1* | 5/2017 | Hanafusa | G01N 1/14 |
| 2017/0168027 A1 | 6/2017 | Hanafusa et al. | |

FOREIGN PATENT DOCUMENTS

| | | |
|---|---|---|
| JP | 2010-60474 A | 3/2010 |
| WO | 2012031222 A1 | 3/2012 |
| WO | 2016/017042 A1 | 2/2016 |

OTHER PUBLICATIONS

Office Action dated Jan. 12, 2021 in Chinese Application No. 201810862594.5, English Translation.

* cited by examiner

PREPROCESSING APPARATUS AND AN ANALYSIS SYSTEM INCLUDING THE PREPROCESSING APPARATUS

BACKGROUND OF THE INVENTION

1. Field of the Invention

The present invention relates to a preprocessing container for perform preprocessing such as extraction processing for removing a specific component unnecessary for analysis out of components contained in a sample of biological origin such as whole blood, serum, plasma, blood in a filter paper, and urine, and extracting an necessary component as a sample, a preprocessing apparatus which automatically performs the preprocessing by using the preprocessing container, and an analysis system including the preprocessing apparatus and automatically performing a series of processes from the preprocessing to analysis of a sample.

2. Description of the Related Art

Upon performing quantitative analysis of a sample such as a biological sample, it may be necessary to perform processing for removing a specific component unnecessary for analysis from the biological sample and extracting a necessary component as a sample, and drying and solidifying processing for concentrating or drying and solidifying the extracted sample. Conventionally, various preprocessing apparatuses for automatically performing such preprocessing are proposed and implemented (see, for example, Patent Document 1).

For example, Patent Document 1 discloses that a plurality of cartridges holding a separating agent that separates a specific component by allowing a sample to pass through the separating agent is held by a common carrying mechanism, the cartridges are sequentially placed in a pressure applying mechanism provided at a predetermined location by the carrying mechanism, pressure is applied to the cartridges in the pressure applying mechanism, and thus, the sample is extracted. In this case, a plurality of extract receivers which receive extracts from the cartridges is moved below the cartridges relative to the cartridges by another carrying mechanism different from the carrying mechanism for the cartridges, and is sequentially placed in the pressure applying mechanism. Thus, extraction of the sample is successively performed.

However, in the above-described method, the carrying mechanisms for the cartridges and the extract receivers cannot be moved while extraction processing of a sample is performed in the pressure applying mechanism, thus, there is a limitation on improvement in preprocessing efficiency. Therefore, it is proposed that a separation device including a filter for filtering a sample and a collecting container for collecting the sample extracted from the separation device are paired and carried in a random-access manner to a port where processing such as filtering processing or stirring processing is performed in order to improve preprocessing efficiency (see Patent Document 2).

PRIOR ART DOCUMENTS

Patent Documents

Patent Document 1: JP 2010-60474 A
Patent Document 2: WO2016/017042A1

SUMMARY OF THE INVENTION

Problems to be Solved by the Invention

There is a demand for combining a conveyor line such as a conveyor belt with the preprocessing apparatus as disclosed in Patent Document 2, introducing a sample from a sample container carried on a conveyor line to the preprocessing apparatus, and fully automatically performing processing from preprocessing to analysis of the sample. However, separation and precipitation of components of a biological sample such as blood or urine may occur until the biological sample is carried to a predetermined location on the conveyor line. Even if the sample in such a state is sucked by a probe, it is impossible to perform accurate analysis. Therefore, it is necessary for a user to stir the sample, for example, by tilting the sample container in advance. Then, there is a risk that mix-up of samples or infection will occur.

Therefore, an object of the present invention is to provide a preprocessing apparatus with a function of stirring and sucking a sample in a sample container carried on a conveyor line outside the preprocessing apparatus.

Solution to the Problems

A preprocessing apparatus according to the present invention includes a sample container setting part, a sampling unit, a preprocessing container setting part, a carrying mechanism, a preprocessing unit, a unit that stirs a sample before suction, and a stirring operation control unit.

In the sample container setting part, a sample container that stores a sample is set. The sampling unit includes a sample probe that sucks a sample in the sample container, and is configured to move the sample probe to the sample container set in the sample container setting part and to an external suction location set on a conveyor line located outside the preprocessing apparatus. A preprocessing container which stores the sample collected from the sample container and dispensed from the sample probe is set in the preprocessing container setting part. The carrying mechanism holds and carries the preprocessing container set in the preprocessing container setting part. The preprocessing unit is disposed at a location to which the preprocessing container can be carried by the carrying mechanism, and performs preprocessing of the sample in the preprocessing container. The unit that stirs a sample before suction includes a stirring probe which stirs a sample in the sample container, and moves the stirring probe at least to the external suction location or a location upstream of the external suction location on the conveyor line. The stirring operation control unit is configured to control operation of the sampling unit and the unit that stirs a sample before suction so that a sample in the sample container is stirred by the stirring probe before the sample is sucked by the sample probe.

It is preferable that the unit that stirs a sample before suction is configured to move the stirring probe to the external suction location, and the stirring operation control unit is configured to stir at the external suction location a sample in the sample container before the sample is sucked by the sample probe. In that case, the sample can be stirred by the sample probe at the external suction location where the sample is sucked from the sample container on the conveyor line. That is, by simply stopping a target sample container at the external suction location on the conveyor line, both stirring and suction of a sample can be performed.

Therefore, it is unnecessary to stop the target sample container at a location for stirring which is other than the external suction location on the conveyor line, processing efficiency improves, and the conveyor line can be easily controlled.

It is preferable that the unit that stirs a sample before suction is configured to be able to move the stirring probe also to the sample container set in the sample container setting part, and the stirring operation control unit is configured to cause the stirring probe to stir a sample in the sample container set in the sample container setting part, before the sample is sucked by the sample probe. In that case, the sample set in the sample container setting part can be stirred before the sample is sucked.

It is preferable that the preprocessing apparatus further includes a pipette attaching and detaching part which is provided on a movement locus of the stirring probe and which attaches and detaches a disposable pipette to and from a front end of the stirring probe. In that case, it is possible to prevent contamination between samples via the stirring probe.

In order to reliably stir the sample by the stirring probe, it is necessary to grasp the amount of the sample stored in the sample container. In order to grasp the amount of the sample in the sample container, a liquid level sensor for detecting whether or not a front end of the sample probe is in contact with a liquid surface may be used. In that case, the stirring operation control unit is configured to detect the liquid level height in the sample container by using the sample probe and the liquid level sensor, before a sample in the sample container is stirred by the stirring probe, and to determine the height of the stirring probe during stirring of the sample according to the detected liquid level height.

The preprocessing apparatus may further include a unit which sets the number of times of stirring, the unit allowing a user to set the number of times that an identical sample is stirred by the stirring probe. In that case, the stirring operation control unit is configured to stir the identical sample the number of times set by the user before the identical sample is sucked by the sample probe.

The analysis system according to the present invention includes the above-described preprocessing apparatus and a liquid chromatograph system. The preprocessing apparatus includes a transfer device that has a transfer port where the preprocessing container in which a sample which has been subjected to preprocessing in the preprocessing unit is set by the carrying mechanism, and is configured to transfer a storage container set in the transfer port to the outside of the preprocessing apparatus by moving the transfer port. The liquid chromatograph system is disposed adjacent to the preprocessing apparatus, and includes: an analysis flow channel through which a mobile phase flows; a sample injecting device which collects a sample in the storage container which has been moved to the outside of the preprocessing apparatus by the transfer device, and injects the sample into the analysis flow channel; an analysis column which is disposed on the analysis flow channel and separates each component of the sample injected by the sample injecting device; and a detector which detects the sample component separated by the analysis column.

Effects of the Invention

The preprocessing apparatus according to the present invention is configured to be able to move the sample probe to the external suction location set on the conveyor line located outside the preprocessing container and to be able to suck a sample at the external suction location. Therefore, it is possible to take in the sample on the conveyor line outside the preprocessing apparatus and to preprocess the sample. The preprocessing apparatus is configured in such a way that a sample in the sample container on the conveyor line is stirred by the unit that stirs a sample before suction including the stirring probe for stirring a sample in the sample container, thus, a sample which has been carried on the conveyor line is automatically stirred before the sample is sucked. Therefore, it is not necessary for a user to stir a sample in the sample container in advance, and risks of mix-up of samples and infection are reduced.

The analysis system according to the present invention includes the above-described preprocessing apparatus. Therefore, it is possible to automatically stir and collect a sample carried on the conveyor line provided outside the preprocessing container, and to automatically perform all the processing from preprocessing to analysis of the sample.

DETAILED DESCRIPTION OF THE INVENTION

Figure 1:
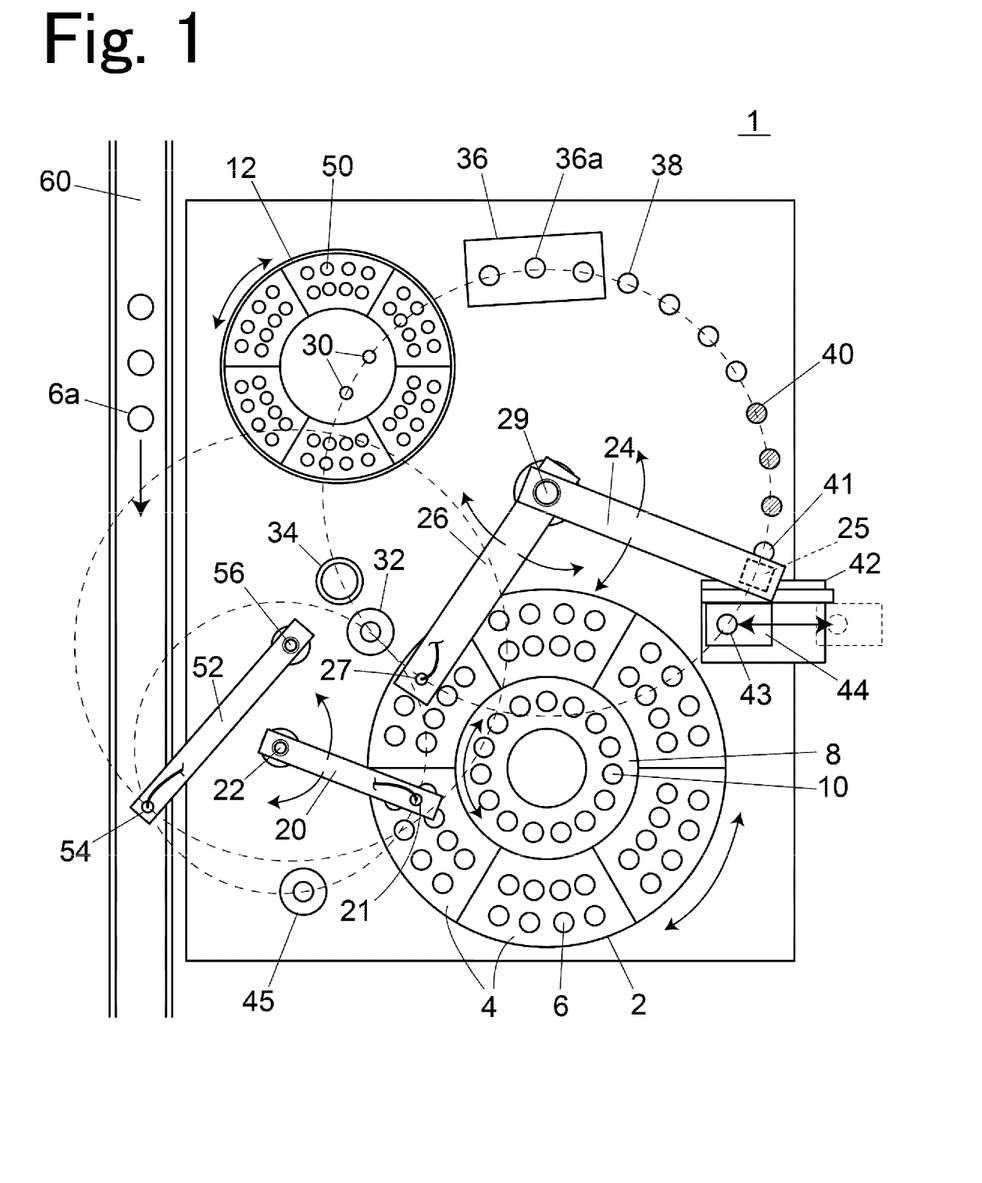
FIG. 1 is a plan view illustrating an embodiment of a preprocessing apparatus.

An embodiment of a preprocessing apparatus will be described with reference to FIG. 1.

A preprocessing apparatus 1 according to the embodiment executes necessary preprocessing items by using one preprocessing container for each sample. The preprocessing apparatus 1 includes a plurality of processing ports (preprocessing unit) for executing the respective preprocessing items. By setting a preprocessing container storing a sample in one of the processing ports, the preprocessing item corresponding to each processing port is executed for the sample stored in the preprocessing container. The preprocessing item is an item of preprocessing necessary for executing an analysis item specified by a user.

The preprocessing container is carried by a carrying arm 24 constitutuing a carrying mechanism. The carrying arm 24 includes a holding part 25 for holding a preprocessing container 50. The holding part 25 is provided on a front-end side of the carrying arm 24. The carrying arm 24 rotates on a horizontal plane with a vertical shaft 29 as a rotation center. The vertical shaft 29 holds a base end part of the carrying arm 24 in such a way that the holding part 25 draws an arcuate locus. All of the processing ports and other ports which are carrying destinations of the preprocessing container 50 are provided along the arcuate locus drawn by the holding part 25, that is, on an identical circumference.

A sample container setting part 2 for setting a sample container 6 storing a sample is provided. A sampling arm 20 including a sample probe 21 located at a front end part thereof is provided in order to collect a sample from a sample container set in the sample container setting part 2. A vertical shaft 22 passes through a base end part of the sampling arm 20. The sampling arm 20 rotates on a horizontal plane around the shaft 22 and moves up and down along the shaft 22 in the vertical direction. The sample probe 21 is attached to a front end part of the sampling arm 20 in a state where the front end of the sample probe 21 is directed vertically downward. The sampling arm 20 causes the sample probe 21 to move so as to draw an arcuate locus on a horizontal plane and to move up and down in the vertical direction.

The base end of the sample probe 21 is connected to a pump (not illustrated) such as a syringe pump, and can suck and discharge a liquid from the front end of the sample probe 21. The sampling arm 20, the sample probe 21, and the pump (not illustrated) connected to the sample probe 21 form a sampling unit 74 (see FIG. 2) for collecting a sample from the sample container 6.

Sample racks 4 for holding the plurality of sample containers 6 are arranged in an annular shape in the sample container setting part 2. The sample container setting part 2 rotates on the horizontal plane so as to move the sample racks 4 in the circumferential direction thereof. Due to rotation of the sample container setting part 2, a desired sample container 6 is arranged at a desired sampling location. The sampling location is a location along the locus of the sample probe 21 provided at the front end of the sampling arm 20. A sample is collected by the sample probe 21 at the sampling location.

On a side of the preprocessing apparatus 1 according to this embodiment, a conveyor belt 60 may be provided as an optional conveyor line. FIG. 1 illustrates a case where the conveyor belt 60 as described above is provided. In a case where the conveyor belt 60 is provided on the side of the preprocessing apparatus 1, the preprocessing apparatus 1 is configured to be able to collect a sample also from a sample container 6a carried by the conveyor belt 60 and to be able to perform preprocessing of the sample.

In order to collect a sample from the sample container 6a on the conveyor belt 60, the sampling arm 20 is configured to be able to move the sample probe 21 to a location on the conveyor belt 60.

In a case where the conveyor belt 60 is provided on a side of the preprocessing apparatus 1, operation of the conveyor belt 60 is controlled by an arithmetic and control unit 100 (see FIGS. 2 and 4) common to the preprocessing apparatus 1. Then, the arithmetic and control unit 100 sets a predetermined location on the conveyor belt 60 as an external suction location at which a sample is sucked from the sample container 6a by the sample probe 21. In a case where a sample is collected from the sample container 6a carried by the conveyor belt 60, the conveyor belt 60 stops when a target sample container 6a reaches the external suction location, and the sample probe 21 moves to the external suction location and sucks the sample from the sample container 6a.

Although not illustrated, a sensor for detecting the sample container 6a on the conveyor belt 60 and a reader for reading identification information (for example, a barcode) attached to the sample container 6a are provided at a specific location along the conveyor belt 60. For example, the "specific location" is the external suction location. When the sample container 6a is carried to the specific location on the conveyor belt 60, the sensor detects the sample container 6a, and a detection signal is transmitted from the sensor to a control unit 62 of the preprocessing apparatus 1 and the arithmetic and control unit 100 (see FIGS. 2 and 4). The preprocessing apparatus 1 recognizes that the sample container 6a has been conveyed to the specific location on the conveyor belt 60 according to the detection signal from the sensor. At that time, the identification information of the sample container 6a read by the reader is also transmitted to the control unit 62 of the preprocessing apparatus 1 and the arithmetic and control unit 100 (see FIGS. 2 and 4).

The preprocessing apparatus 1 according to this embodiment includes a unit 76 that stirs a sample before suction (see FIG. 2) so as to be able to stir the sample in each of the sample containers 6 and 6a to be sucked before the sample is sucked by the sample probe 21. The unit 76 that stirs a sample before suction (see FIG. 2) includes a stirring arm 52 including a stirring probe 54 for stirring a sample. The stirring probe 54 is provided at a front end part of the stirring arm 52. The base end of the stirring arm 52 is pivotally supported by a stirring arm supporting column 56 so as to extend in the horizontal direction. The stirring arm 52 is configured to rotate on the horizontal plane with the stirring arm supporting column 56 as a rotation center and to move up and down.

The stirring probe 54 is held by the stirring arm 52 in a state where the front end of the stirring probe 54 is directed vertically downward, and moves so as to draw an arcuate locus in association with rotation of the stirring arm 52. The base end of the stirring probe 54 is connected to a pump (not illustrated) such as a syringe pump or a peristaltic pump. When the pump is driven, liquid is sucked or discharged from the front end of the stirring probe 54. The stirring probe 54 stirs a sample by repeatedly sucking and discharging the sample from the front end of the stirring probe 54.

The position of the stirring arm supporting column 56 and the length of the stirring arm 52 are designed so that the sampling location and the external suction location described above are located on the locus of the stirring probe 54. As a result, the stirring probe 54 can stir the sample in the sample container 6 set at the sampling location and can stir the sample in the sample container 6a set at an external injection location on the conveyor belt 60.

Note that the location on the conveyor belt 60 where the sample in the sample container 6a is stirred by the stirring probe 54 is not necessarily the external suction location where the sample is sucked from the sample container 6a by the sample probe 54. A configuration may be adopted in which the stirring probe 54 stirs the sample at a location upstream of the external suction location on the conveyor belt 60. In that case, the position of the stirring arm supporting column 56 and the length of the stirring arm 52 are designed so that the stirring probe 54 passes through the location upstream of the external suction location on the conveyor belt 60, and the conveyor belt 60 is controlled in such a way that a target sample container 6a stops at the location where a sample is to be stirred by the stirring probe 54 when the target sample container 6a comes to the location.

In addition, in order to prevent the stirring arm 52 from interfering with another arm such as the sampling arm 20 when the stirring arm 52 moves, operation of each arm is controlled in such a way that one or both arms which might interfere with each other moves, for example, up or down so as to avoid contact with each other.

Here, it is necessary to prevent contamination of samples via the stirring probe 54. Therefore, it is preferable that a cleaning port or a pipette attaching and detaching part is provided at a location along the locus of the stirring probe 54. The cleaning port is provided on the locus of the stirring probe 54 for cleaning the inner and outer surfaces of the stirring probe 54. The pipette attaching and detaching part attaches and detaches a disposable pipette to and from the front end of the stirring probe 54.

A dispensation port 32 is provided at a location along the locus of the sample probe 21 and at a location along the locus of the holding part 25 of the carrying arm 24. The dispensation port 32 is a port at which the sample probe 21 dispenses a sample to an unused preprocessing container 50. The unused preprocessing container 50 is set in the dispensation port 32 by the carrying arm 24.

A reagent setting part 8 for setting a reagent container 10 is provided inside the sample container setting part 2. A reagent arm 26 for collecting a reagent from the reagent container set in the reagent setting part 8 is provided. The base end of the reagent arm 26 is supported by the vertical shaft 29 common to the carrying arm 24 and rotates on a horizontal plane and moves up and down. A probe 27 is provided at a front end part of the reagent arm 26. The probe 27 is provided in a state where the front end thereof is directed vertically downward. The probe 27 moves on a horizontal plane so as to draw an arcuate locus identical to the arcuate locus that the holding part 25 of the carrying arm 24 draws, and moves up and down. The base end of the probe 27 is connected to a syringe pump that sucks and discharges liquid. A reagent is sucked and discharged from the front end of the probe 27.

The reagent setting part 8 rotates on a horizontal plane independently of the sample container setting part 2. A plurality of reagent containers 10 is annularly arranged in the reagent setting part 8. When the reagent setting part 8 rotates, the reagent containers 10 are carried in the rotation direction, and thus, a desired reagent container 10 is set at a predetermined reagent collecting location. The reagent collecting location is a location along the locus of the probe 27 of the reagent arm 26 and is a location for collecting a reagent by the probe 27. After sucking a predetermined reagent, the probe 27 dispenses the sucked reagent to the preprocessing container 50 set in the dispensation port 32, and thus adds the reagent to the sample.

A preprocessing container setting part 12 is provided at a location other than the locations where the sample container setting part 2 and the reagent setting part 8 are provided. The preprocessing container setting part 12 is configured to arrange unused preprocessing containers 50 in an annular shape. The preprocessing container setting part 12 rotates on a horizontal plane and moves the preprocessing container 50 in the circumferential direction to set an arbitrary preprocessing container 50 at a location along the locus of the holding part 25 of the carrying arm 24. The carrying arm 24 can hold an unused preprocessing container 50 set at a location along the locus of the holding part 25.

A filtration port 30, a stirring port 36a, and temperature adjustment ports 38, 40 are provided as ports of the preprocessing unit for storing preprocessing containers and executing specific preprocessing items. The filtration ports 30 are provided at two locations inside the preprocessing container setting part 12. Three stirring ports 36a are provided in a stirring unit 36 provided in the vicinity of the preprocessing container setting part 12. The temperature adjustment ports 38, 40 are arranged side by side on an arc. A dilution port 41 is provided adjacent to the temperature adjustment port 40.

A negative pressure applying mechanism is connected to the filtration port 30 so that filtration is performed by applying negative pressure to the preprocessing container 50 set in the filtration port 30. The filtration port 30 and the negative pressure applying mechanism constitute the preprocessing unit for performing filtration of a sample as preprocessing. Although not illustrated, the preprocessing container 50 in this embodiment is configured of a separation device whose bottom surface is a separation membrane, and a collecting container which is attached to a lower part of the separation device and collects extract which has passed through the separation membrane. A sample to be dispensed by the sample probe 21 is stored in the separation device located at an upper part of the preprocessing container 50. Then, a predetermined reagent is added and the preprocessing container 50 is set at the filtration port 30. Thus, components in the sample are extracted through the separation membrane and collected in a collecting container.

The stirring unit 36 also constitutes the preprocessing unit. The stirring unit 36 has a mechanism for periodically operating the respective stirring ports 36a individually on a horizontal plane, and stirs a sample solution in the preprocessing container 50 set in each stirring port 36a. The temperature adjustment ports 38 and 40 also constitute the preprocessing unit and are provided in a thermally-conductive block whose temperature is controlled by, for example, a heater and a Peltier element.

Here, the stirring unit 36 is configured to stir a solution in the preprocessing container 50 in which a sample and a reagent are dispensed. In contrast, the unit that stirs a sample before suction configured of the stirring arm 52 and the stirring probe 54 is configured to stir a sample before being sucked from the sample container 6 or 6a by the sample probe 21.

The preprocessing apparatus 1 includes a sample transfer device 42 for transferring a sample which has been subjected to preprocessing to a side where a sample injecting device (for example, an autosampler or the like) disposed adjacent to the processing apparatus 1 exists. The sample transfer device 42 is provided on a casing side edge part. The sample transfer device 42 includes a moving part 44 which is moved in one direction (direction indicated by arrows in FIG. 1) on a horizontal plane by a driving mechanism including a rack-and-pinion mechanism. A transfer port 43 in which the preprocessing container 50 storing a preprocessed sample is set is provided on an upper surface of the moving part 44.

When a sample is transferred to the side where the sample injection apparatus is located, after the preprocessing container 50 is set in the transfer port 43, the moving part 44 moves toward the outside of the preprocessing apparatus 1. Thus, the transfer port 43 is disposed at a location (location indicated by a broken line in the drawing) on the side where the adjacent sample injecting device exists. At this location, a sampling nozzle provided in the sample injecting device sucks the sample. When suction of the sample performed by the sample injecting device is completed, the moving part 44 returns to the original position (position indicated by a solid line in the drawing) and the preprocessing container 50 is collected by the carrying arm 24. The used preprocessing container 50 is carried to a disposal port 34 by the carrying arm 24 and is disposed of at the disposal port 34.

A cleaning port 45 for cleaning the sample probe 21 is provided at a location along the locus of the sample probe 21. Although not illustrated, a cleaning port for cleaning the probe 27 is provided at a location along the locus of the probe 27.

Figure 2:
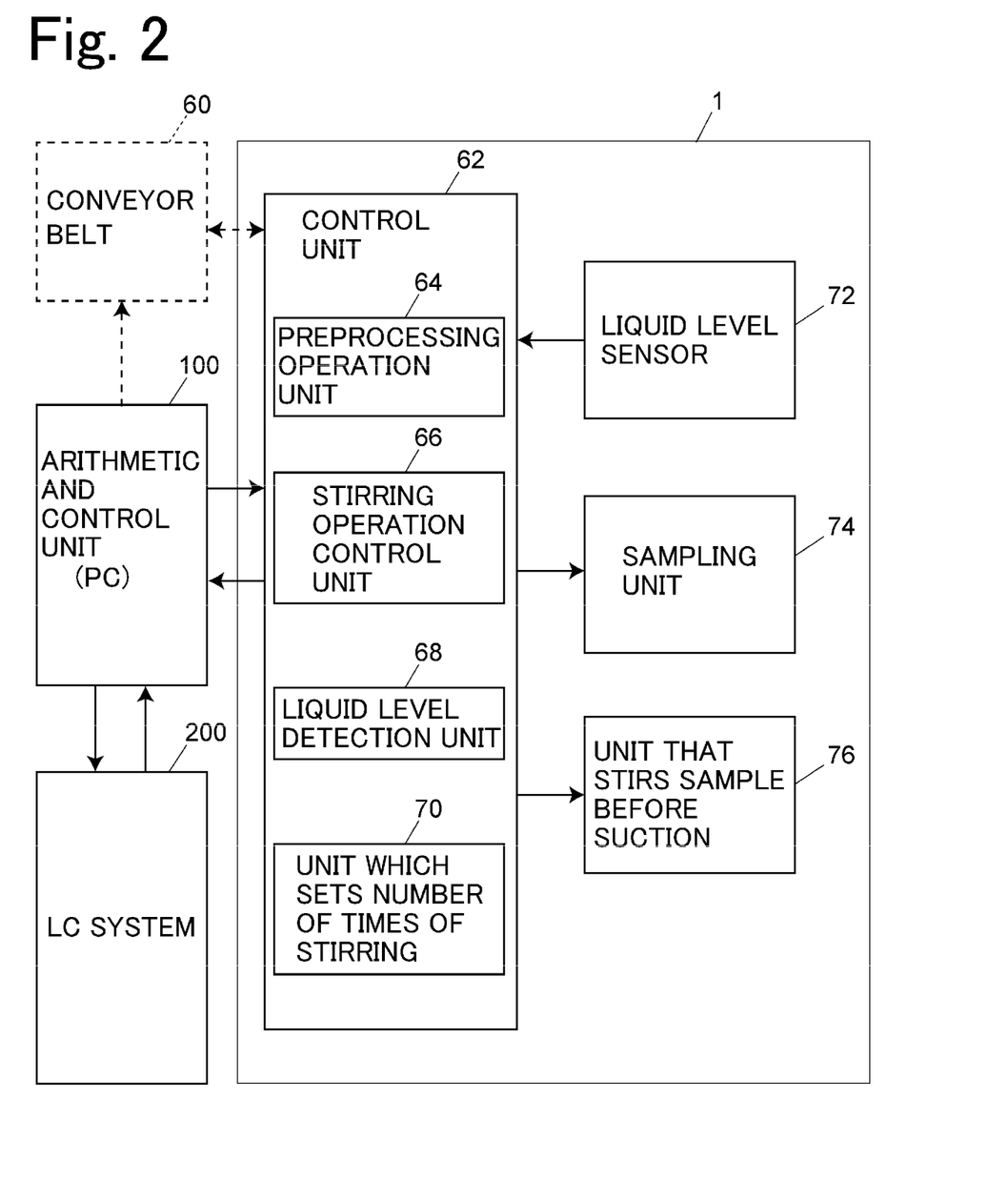
FIG. 2 is a block diagram illustrating a control system of the embodiment.

Next, a control system of the preprocessing apparatus 1 will be described with reference to FIG. 2.

The preprocessing apparatus 1 includes the control unit 62 which controls operation of each constituent. In FIG. 2, only the sampling unit 74 and unit 76 that stirs a sample before suction are illustrated as constituents of the preprocessing apparatus 1 controlled by the control unit 62. However, operation of other constituents is also controlled by the control unit 62. The control unit 62 is realized by a microcomputer or the like provided in the preprocessing apparatus 1. Although not illustrated in FIG. 1, the preprocessing apparatus 1 includes a liquid level sensor 72 for detecting the liquid level in the sample container 6 or 6a. The liquid level sensor 72 is realized by, for example, a capacitive sensor provided in the sample probe 21.

The arithmetic and control unit 100 is electrically connected to the control unit 62. The arithmetic and control unit 100 is realized by, for example, a personal computer (PC) or a dedicated computer. A user manages the preprocessing apparatus 1 via the arithmetic and control unit 100.

A liquid chromatograph system (hereinafter referred to as an LC system) 200 is also electrically connected to the arithmetic and control unit 100. The LC system 200 is disposed adjacent to the preprocessing apparatus 1 and analyzes a sample which has been subjected to preprocessing in the preprocessing apparatus 1. Operation of the LC system 200 is managed by the arithmetic and control unit 100 so that the sample injecting device 202 (see FIG. 4) provided in the LC system 200 operates in conjunction with operation of the preprocessing apparatus 1.

In a case where the conveyor belt 60 is provided outside the preprocessing apparatus 1, the conveyor belt 60 is also electrically connected to the arithmetic and control unit 100. Operation of the conveyor belt 60 is managed by the arithmetic and control unit 100 in such a way that the conveyor belt 60 operates in conjunction with the preprocessing apparatus 1.

The control unit 62 includes a preprocessing operation unit 64, a stirring operation control unit 66, a liquid level detection unit 68, and a unit 70 which sets the number of times of stirring. The preprocessing operation unit 64, the stirring operation control unit 66, the liquid level detection unit 68, and the unit 70 which sets the number of times of stirring are functions obtained by causing the microcomputer constituting the control unit 62 to execute software.

The preprocessing operation unit 64 is configured to control operation of the constituent corresponding to a preprocessing item set in advance for a target sample so that the item is executed. In the preprocessing operation, the position of the sample container 6 or 6a storing the target sample is specified, the sample is sucked from the sample container 6 or 6a by the sample probe 21, and the sample is dispensed in an unused preprocessing container 50. Then, necessary reagent is added to the preprocessing container 50, the preprocessing container 50 is carried to the preprocessing port corresponding to the set preprocessing item, and each preprocessing item is executed.

The stirring operation control unit 66 is configured to control the unit 76 that stirs a sample before suction in such a way that the sample in the target sample container 6 or 6a is stirred before the above-described preprocessing operation is performed, that is, before the sample is sucked by the sample probe 21.

The liquid level detection unit 68 is configured to detect the liquid level height in the sample container 6 or 6a according to a signal from the liquid level sensor 72. For example, in a case where the liquid level sensor 72 is a capacitive sensor provided in the sample probe 21, the sample probe 21 is lowered from above the sample container 6 or 6a, and the height of the front end of the sample probe 21 obtained when a change in capacitance exceeds a threshold value set in advance can be detected as the liquid level height in the sample container 6 or 6a.

The stirring operation control unit 66 is configured to determine the height of the stirring probe 54 to be lowered during stirring according to the liquid level height in the sample container 6 or 6a detected by the liquid level detection unit 68, to lower the stirring probe 54 to the height, and to perform stirring of the sample.

The unit 70 which sets the number of times of stirring is configured to allow a user to set the number of times of stirring in the sample container 6 or 6a to be executed before sample suction. Specifically, when a request is made from a user, the unit 70 causes a screen for allowing the user to set the number of times of stirring to be displayed on a monitor (not illustrated), and allows the user to input the number of times of stirring. The stirring operation control unit 66 is configured to stir the sample in the sample container 6 or 6a the number of times set by the user before the sample is sucked by the sample probe 21. The number of times of stirring is the number of repetitions of suction and discharge of the sample from the front end of the stirring probe 54. In a case where the user sets the number of times of stirring to 0, the sample is sucked by the sample probe 21 without being stirred by the stirring probe 54.

Figure 3:
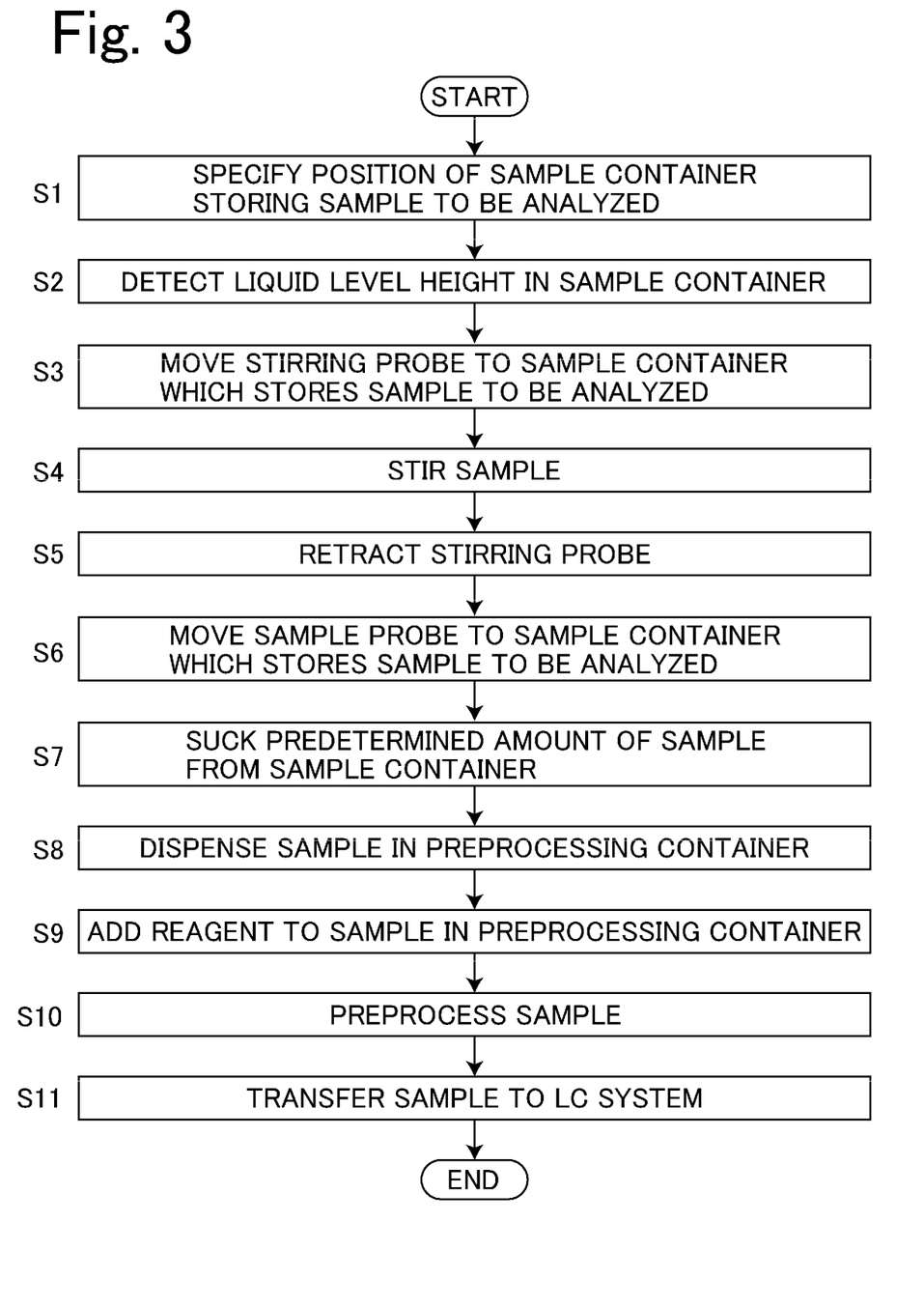
FIG. 3 is a flowchart illustrating a series of operations performed for one sample of the embodiment.

An example of a series of preprocessing operations for one sample will be described with reference to the flowchart of FIG. 3 together with FIG. 1.

First, in a case where a sample to be analyzed is stored in the sample container 6, the position of the sample container 6 is specified according to information registered in advance by a user (step S1). In contrast, in a case where a sample to be analyzed is stored in the sample container 6a on the conveyor belt 60, the sensor (not illustrated) provided at a location along the conveyor belt 60 detects that the sample container 6a has reached a specific location, the reader (not illustrated) reads identification information of the sample container 6a, and thus, the position of the sample container 6a storing the sample to be analyzed is specified (step S1). After the position of the target sample container 6 or 6a is specified, the target sample container 6 or 6a is set at a predetermined location (the sampling location or the external suction location), and the liquid level height in the sample container 6 or 6a is detected by the liquid level sensor (step S2).

Next, the stirring probe 54 is moved to the target sample container 6 or 6a, and is lowered to a height determined according to the liquid level height in the sample container 6 or 6a to stir the sample (steps S3 and S4). The stirring operation of the sample is executed a predetermined number of times set in advance by the user.

After stirring of the sample is completed, the stirring probe 54 is retracted to another location (for example, the location where the cleaning port or the attachment and detachment part of the disposable pipette exists), and the sample probe 21 is moved to the sample container 6 or 6a (step S5). Then, the sample probe 21 is lowered to the height determined according to the liquid level height in the sample container 6 or 6a, and a predetermined amount of sample is sucked from the front end of the sample probe 21 (step S7).

The sample probe 21 which has sucked the sample moves to the dispensation port 32. In the dispensation port 32, an unused preprocessing container 50 is set in advance by the carrying arm 24, and the sample is dispensed from the front end of the sample probe 21 to the preprocessing container 50 (step S8). After a necessary reagent is dispensed by the reagent probe 27 in the preprocessing container 50 in which the sample has been dispensed (step S9), the preprocessing container 50 is carried to the preprocessing port for executing a preprocessing item set in advance for the sample, and preprocessing is executed (step S10). After the preprocessing on the sample is completed, the sample which has been subjected to the preprocessing is transferred to a side where the LC system 200 exists by the sample transfer device 42 (step S11).

Figure 4:
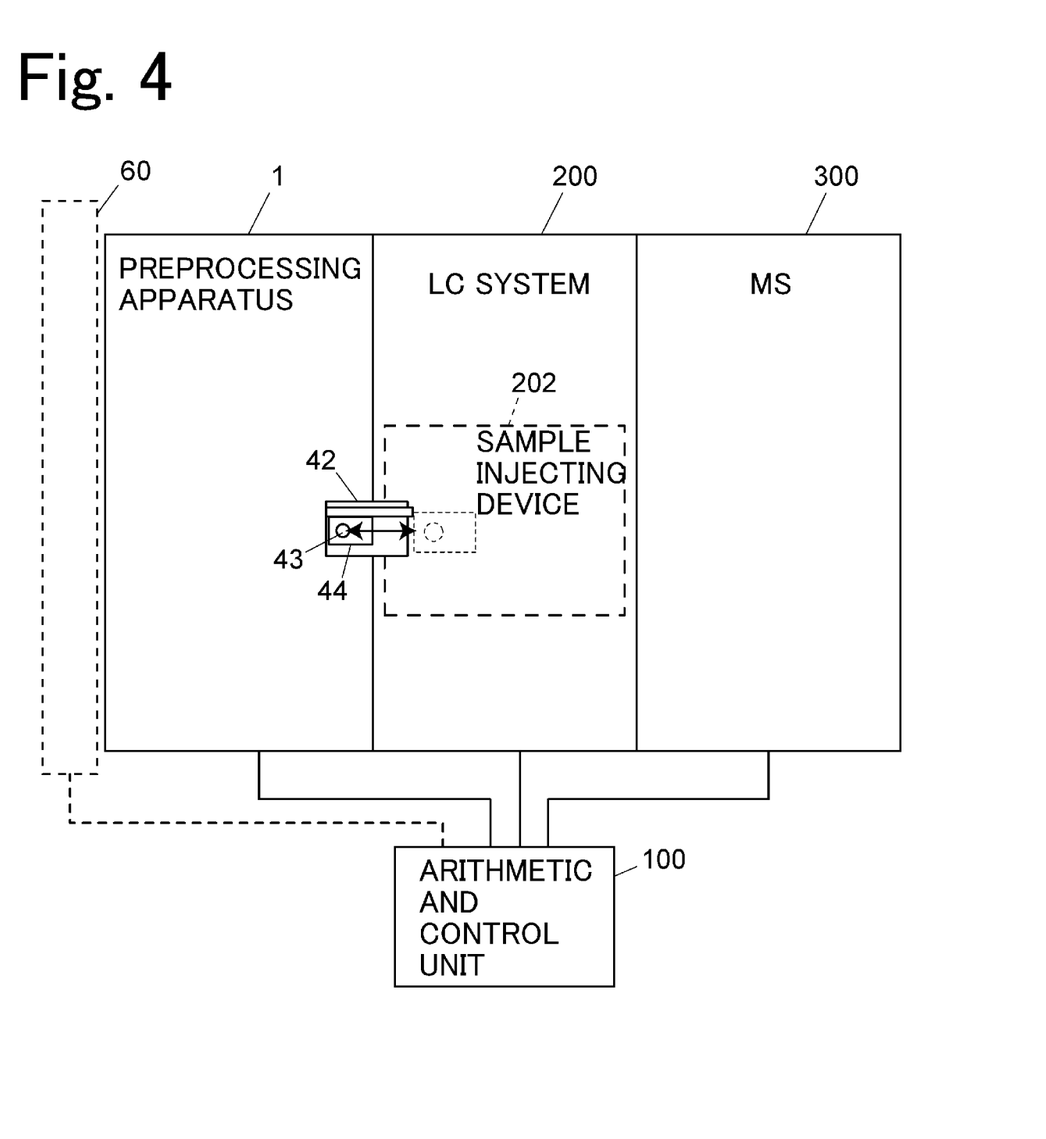
FIG. 4 is a block diagram schematically illustrating an embodiment of an analysis system.

Next, an embodiment of an analysis system including the preprocessing apparatus 1 will be described with reference to FIG. 4.

The LC system 200 is disposed adjacent to the preprocessing apparatus 1 described in the above embodiment, and a mass spectrometer (MS) is disposed adjacent to the LC system 200. Operation of the preprocessing apparatus 1, the conveyor belt 60 (if set), the LC system 200, and the MS 300 are managed by the common arithmetic and control unit 100.

The LC system 200 includes the sample injecting device 202 which collects the sample that has been subjected to preprocessing in the preprocessing apparatus 1 and injects the sample into an analysis flow channel of a liquid chromatograph. As described above, the preprocessing apparatus 1 includes the transfer device 42 that transfers the preprocessing container 50 (collecting container) in which the sample which has been subjected to preprocessing is stored to the side where the LC system 200 exists, and the sample injecting device 202 collects the sample from the preprocessing container 50 (collecting container) transferred by the transfer device 42 to the side where the LC system 200 exists. When the moving part 44 of the transfer device 42 moves to the side where the LC system 200 exists, the preprocessing container 50 (collecting container) set in the transfer port 43 of the moving part 44 is set at a predetermined location in the sample injecting device 202.

When the preprocessing container 50 (collecting container) storing the sample which has been subjected to preprocessing in the preprocessing apparatus 1 is set in the transfer port 43 of the transfer device 42 and the moving part 44 is moved to the side where the LC system 200 exists in such a way that the preprocessing container 50 (collecting container) is set at the predetermined location in the sample injecting device 202, a signal to that effect is transmitted to the sample injecting device 202 via the arithmetic and control unit 100, and the sample injecting device 202 starts operation of collecting the sample from the preprocessing container 50 (collecting container). The transfer device 42 holds the preprocessing container 50 (collecting container) at the predetermined location in the sample injecting device 202 until the sampling operation performed by the sample injecting device 202 is completed. When the sampling operation performed by the sample injecting device 202 is completed, a signal to that effect is transmitted to the preprocessing apparatus 1 via the arithmetic and control unit 100, and the transfer device 42 moves the moving part 44 to a side where the preprocessing apparatus 1 exists to return the preprocessing container 50 (collecting container) to a predetermined location in the preprocessing apparatus 1. The preprocessing container 50 (collecting container) returned to the side where preprocessing apparatus 1 exists is carried to the disposal port 34 by the carrying arm 24 and is disposed of.

Figure 5:
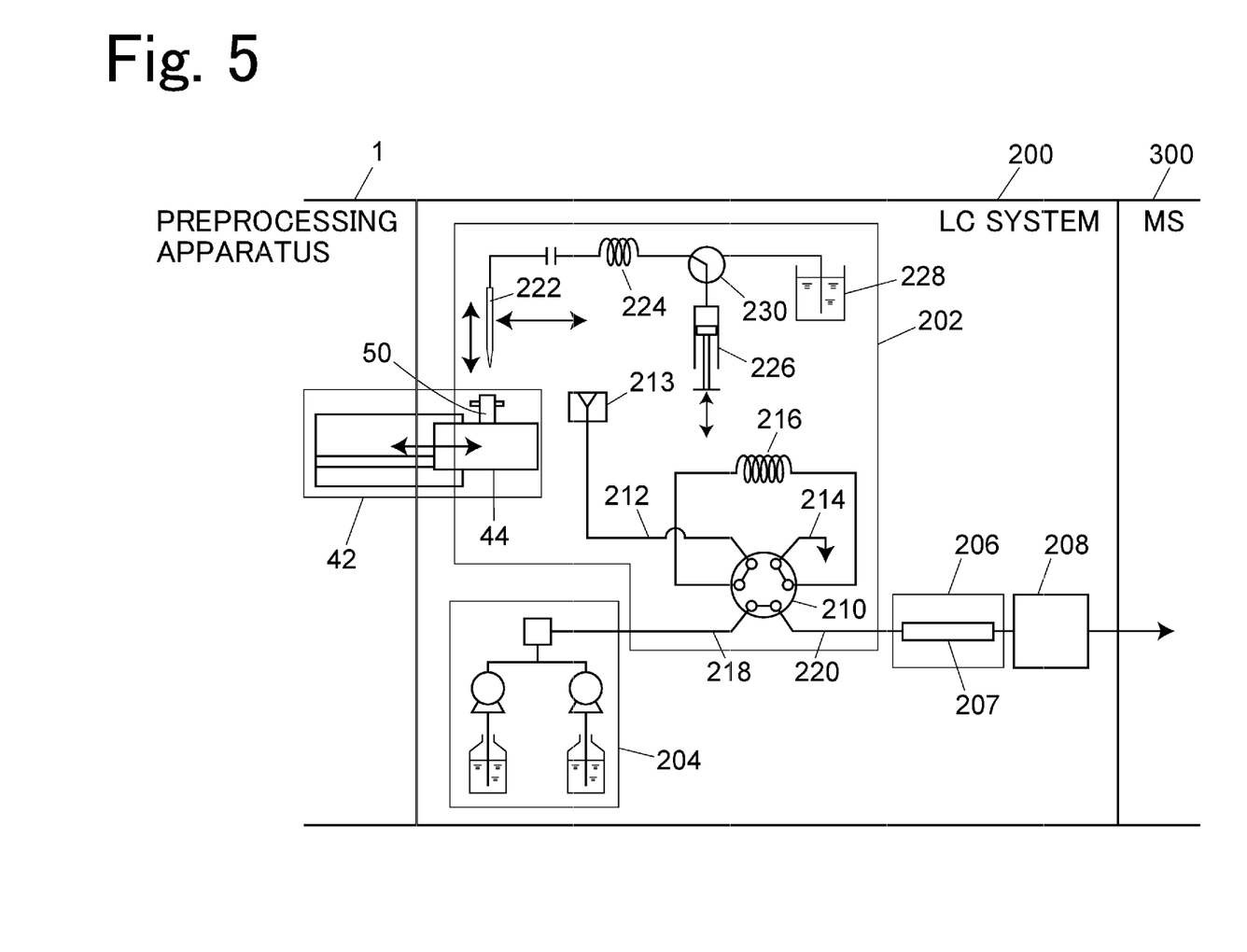
FIG. 5 is a flow channel configuration diagram illustrating a configuration of a liquid chromatograph system in the embodiment.

The LC system 200 in this embodiment will be described with reference to FIG. 5.

The LC system 200 includes, in addition to the sample injecting device 202, a liquid delivery device 204, a column oven 206, and a detector 208. The liquid delivery device 204 is a device that delivers, for example, two kinds of solvents to a mixer by a liquid delivery pump and delivers a solution mixed by the mixer as a mobile phase. The column oven 206 includes an analysis column 207 for separating respective components of a sample (preprocessed sample). The detector 208 is a detector such as an ultraviolet-ray absorption detector for detecting sample components separated by the analysis column 207.

The liquid delivery device 204 is located at the upstream end of an upstream-side analysis flow channel 218 and delivers the mobile phase through the upstream-side analysis flow channel 218. The analysis column 207 and the detector 208 are provided on a downstream-side analysis flow channel 220. Both the upstream-side analysis flow channel 218 and the downstream-side analysis flow channel 220 are connected to ports of a two-position valve 210 provided in the sample injecting device 202, and are connected to each other via the two-position valve 210.

The two-position valve 210 of the sample injecting device 202 has six ports. In addition to the upstream-side analysis flow channel 218 and the downstream-side analysis flow channel 220, a sample introduction flow channel 212, a drain flow channel 214, and one end and the other end of the sample loop 216 are connected to the ports of the two-position valve 210, respectively. By switching the two-position valve 210, one of the following two states can be selected: (1) the state where the sample introduction flow channel 212, the sample loop 216 and the drain flow channel 214 are connected in series, and the downstream-side analysis flow channel 220 is connected immediately downstream of the upstream-side analysis flow channel 218 (state illustrated in FIG. 5); and (2) a state where the upstream-side analysis flow channel 218, the sample loop 216, and the downstream-side analysis flow channel 220 are connected in series. The sample introduction flow channel 212 communicates with an injection port 213.

The sample injecting device 202 includes a needle 222 capable of injecting and discharging liquid from the front end thereof, and a syringe pump 226 connected to the needle 222 via a flow channel. The needle 222 is configured to move in the horizontal direction and the vertical direction by a driving mechanism, not illustrated. The needle 222 can collect a sample from the preprocessing container 50 (collecting container) transferred to the side where the LC system 200 exists by the transfer device 42, and can inject the sample from the injection port 213. By switching a flow channel switching valve 230, it is possible to connect the syringe pump 226 also to a cleaning liquid container 228 storing cleaning liquid. By delivering the cleaning liquid from the syringe pump 226 in a state where the syringe pump 228 that has sucked the cleaning liquid is connected to the needle 222 and the needle 222 is connected to the injection port 213, it is possible to clean the inside of the sample loop 224, the needle 222, and the sample introduction flow channel 212.

When a sample stored in the preprocessing container 50 (collecting container) is collected, the front end of the needle 22 is inserted into the preprocessing container 50 (collecting container), the sample is sucked by the syringe pump 226, and the sample is held in the sample loop 224 provided between the needle 222 and the syringe pump 226. The sample held in the sample loop 224 is injected from the injection port 213. When the sample is injected from the injection port 213, the two-position valve 210 is switched in such a way that (1) the sample introduction flow channel 212, the sample loop 216, and the drain flow channel 214 are connected in series, and the sample injected from the injection port 213 is held in the sample loop 216. Then, by switching two-position valve 210 in such a way that (2) the upstream-side analysis flow channel 218, the sample loop 216, and the downstream-side analysis flow channel 220 are connected in series. Thus, the sample held in the sample loop 216 is introduced into the analysis column 207 by the mobile phase from the liquid delivery device 204, and respective components of the sample are separated in the analysis column 207. Each component separated in the analysis column 207 is detected by the detector 208 and then is introduced into the MS 300.

A signal obtained by the detector 208 or the MS 300 is fetched by the arithmetic and control unit 100 (see FIG. 4), and arithmetic processing such as quantitative analysis or composition analysis of each component separated in the analysis column 207 is performed.

What is claimed is:

1. A preprocessing apparatus comprising:
  a sample container setting part in which a sample container that stores a sample is set;
  a sampling unit which includes a sample probe for sucking a sample from the sample container, and is configured to move the sample probe to the sample container setting part and an external suction location set on a conveyor line located outside the preprocessing apparatus;
  a preprocessing container setting part in which a preprocessing container for containing the sample collected from the sample container and dispensed from the sample probe is set;
  a carrying mechanism which holds and carries the preprocessing container set in the preprocessing container setting part;
  a preprocessing unit which is disposed at a location to which the preprocessing container can be carried by the carrying mechanism, and performs preprocessing of the sample in the preprocessing container;
  a stirring unit which includes a stirring probe, which is different from the sample probe, for stirring the sample in the sample container, and moves the stirring probe to the external suction location or a location upstream of the external suction location on the conveyor line; and
  a stirring operation control unit which is configured to control operation of the sampling unit and the stirring unit so that the sample in the sample container arranged at the external suction location or the location upstream of the external suction location is stirred by the stirring probe, and then, the sample stirred by the stirring probe is sucked by the sample probe from the sample container arranged at the external suction location.

2. The preprocessing apparatus according to claim 1,
  wherein the stirring unit is configured to move the stirring probe to the external suction location, and
  wherein the stirring operation control unit is configured to cause the stirring probe to stir at the external suction location a sample in the sample container before the sample is sucked by the sample probe.

3. An analysis system comprising:
  a preprocessing apparatus according to claim 2, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and
  a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

4. The preprocessing apparatus according to claim 1,
  wherein the stirring unit is configured to be able to move the stirring probe also to the sample container set in the sample container setting part, and
  wherein the stirring operation control unit is configured to cause the stirring probe to stir a sample in the sample container set in the sample container setting part, before the sample is sucked by the sample probe.

5. An analysis system comprising:
  a preprocessing apparatus according to claim 4, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and
  a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

6. The preprocessing apparatus according to claim 1 further comprising a pipette attaching and detaching part which is provided on a movement locus of the stirring probe and which attaches and detaches a disposable pipette to and from a front end of the stirring probe.

7. An analysis system comprising:
  a preprocessing apparatus according to claim 6, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and
  a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

8. The preprocessing apparatus according to claim 1 further comprising a liquid level sensor which detects whether or not a front end of the sample probe is in contact with a liquid surface,     wherein the stirring operation control unit is configured to detect a liquid level height in the sample container by using the sample probe and the liquid level sensor, before the sample in the sample container is stirred by the stirring probe, and to determine a height of the stirring probe during stirring of the sample according to the liquid level height that is detected.

9. An analysis system comprising:

a preprocessing apparatus according to claim 8, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

10. The preprocessing apparatus according to claim 1 further comprising a unit which sets a number of times of stirring, the unit allowing a user to set a number of times that an identical sample is stirred by the stirring probe,     wherein the stirring operation control unit is configured to stir the identical sample the number of times set by the user before the identical sample is sucked by the sample probe.

11. An analysis system comprising:

a preprocessing apparatus according to claim 10, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

12. An analysis system comprising:

a preprocessing apparatus according to claim 1, the preprocessing apparatus including a transfer device that has a transfer port where the preprocessing container in which the sample which has been subjected to preprocessing in the preprocessing unit is set by the carrying mechanism, and is configured to transfer a storage container set in the transfer port to outside of the preprocessing apparatus by moving the transfer port; and a liquid chromatograph system which is disposed adjacent to the preprocessing apparatus, the liquid chromatograph system including an analysis flow channel through which a mobile phase flows, a sample injecting device which collects the sample in the storage container that has been moved to outside of the preprocessing apparatus by the transfer device and injects the sample into the analysis flow channel, an analysis column which is disposed on the analysis flow channel and separates each component of the sample injected by the sample injecting device, and a detector which detects the each sample component separated by the analysis column.

* * * * *